Dec. 21, 1965 J. J. NEFF 3,224,699

MAGNETIC TAPE TRANSPORT APPARATUS

Filed April 22, 1963 2 Sheets-Sheet 1

Dec. 21, 1965 J. J. NEFF 3,224,699

MAGNETIC TAPE TRANSPORT APPARATUS

Filed April 22, 1963 2 Sheets-Sheet 2

United States Patent Office 3,224,699
Patented Dec. 21, 1965

3,224,699
MAGNETIC TAPE TRANSPORT APPARATUS
Joseph J. Neff, Pasadena, Calif., assignor to Consolidated Electrodynamics Corporation, Pasadena, Calif., a corporation of California
Filed Apr. 22, 1963, Ser. No. 274,396
18 Claims. (Cl. 242—55.12)

This invention relates to magnetic tape recorders and more particularly is concerned with a high speed transport capable of substantially instantaneous starting and stopping and reversing of the tape in the operational zone.

Magnetic tape has been used extensively in the digital processing field to store large quantities of digitized data. A tape transport for use with the recording and reading out of digitized data must have the ability to start and stop and reverse the tape very rapidly and at the same time provide a relatively high linear tape speed to get adequate information packing densities on the tape. Because the tape is normally stored on reels which have a large inertia and therefore are not capable of the high starting, stopping and reversing accelerations required, digital tape transports are arranged with some sort of buffering means such as vacuum columns for storing a length of slack tape between the operational zone and the reels. The slack loop permits the tape to be accelerated very rapidly within the operational zone while permitting the reels to start, stop, and reverse with much slower accelerations.

In addition to vacuum columns, multiple loop guides mounted on moving arms have been used in the past either alone or in combination with a small vacuum column. Such arrangements have been relatively costly to manufacture, or have been inadequate to provide the speed and reliability demanded for high performance digital recording.

It has been the practice heretofore to control the reels by servo motors which in turn are controlled in response to variations in the length of the slack loops. Because of the high inertia of a reel loaded with magnetic tape, these servo motors have to produce relatively large peak torques during the time a reel is reversed from maximum speed of rotation in one direction to maximum speed of rotation in the opposite direction. Because the servo motors are driven by servo controlled power amplifiers, the servo motors and the associated servo drive circuits form an expensive and complicated part of the tape driven system.

It is the purpose of the present invention to provide a magnetic tape transport suitable for digital recording. The transport is capable of producing tape speeds of over one hundred and twenty-five inches per second and yet is capable of starting and stopping as well as reversing the direction of tape through the operational zone in less than five milliseconds. The invention is characterized by its relative simplicity and correspondingly low cost of manufacture. At the same time, the transport is rugged and foolproof in its design.

These and other advantages of the present invention are achieved by apparatus comprising a pair of tape storage reels journalled for rotation, with the tape passing from one reel to the other reel through an operational zone in which is located a tape drive unit for imparting constant linear speed to the tape in either direction through the operational zone. Resilient guide means is provided for the tape between each of the reels and the operational zone to provide slack in the tape to permit the reels to accelerate at a lower rate than the tape in the operational zone.

Each of the reels is operated by a reel drive means comprising a reversible torque motor, and an anti-feedback clutch having an input shaft connected to the motor. The clutch is arranged to provide for transfer of torque from the input shaft to the output shaft but any torque fed back into the output shaft from the load is transferred to the supporting frame and not to the input shaft. The output shaft of the clutch is coupled to the associated reel by a resilient drive member such as a torsion spring. The torsion spring and anti-feedback clutch permit kinetic energy of the reel to be stored in the spring when a reverse command is given to the associated drive motor. The spring feeds the energy back to the reel when the direction of rotation of the reel reverses. Thus the torque required for reversal of the reel is supplied almost entirely by the spring, greatly reducing the peak torque imposed on the reel drive motor during the reversal operation.

Tape loop storage is provided by two sets of guide posts, one set being stationary and the other set moving in a linear path of approximately six inches. The tape is looped back and forth between the guide posts in the two sets. The guide posts are air pressure lubricated to reduce friction to substantially zero between the tape and the tape loop storage unit. Constant tape tension in the tape loop storage unit is provided by an air cylinder which operates the moving set of guide posts to urge them away from the stationary set of guide posts. A variable auto-transformer is driven by the air cylinder, providing a variable amplitude, reversing phase A.C. signal for controlling the associated reel drive motor, thus eliminating the need for any expensive servo amplifier for driving the motor.

For a more complete understanding of the invention, reference should be had to the accompanying drawings, wherein:

FIGURE 1 is a schematic drawing of the tape transport system;

Figures 2, 4, 6, 7, 8:
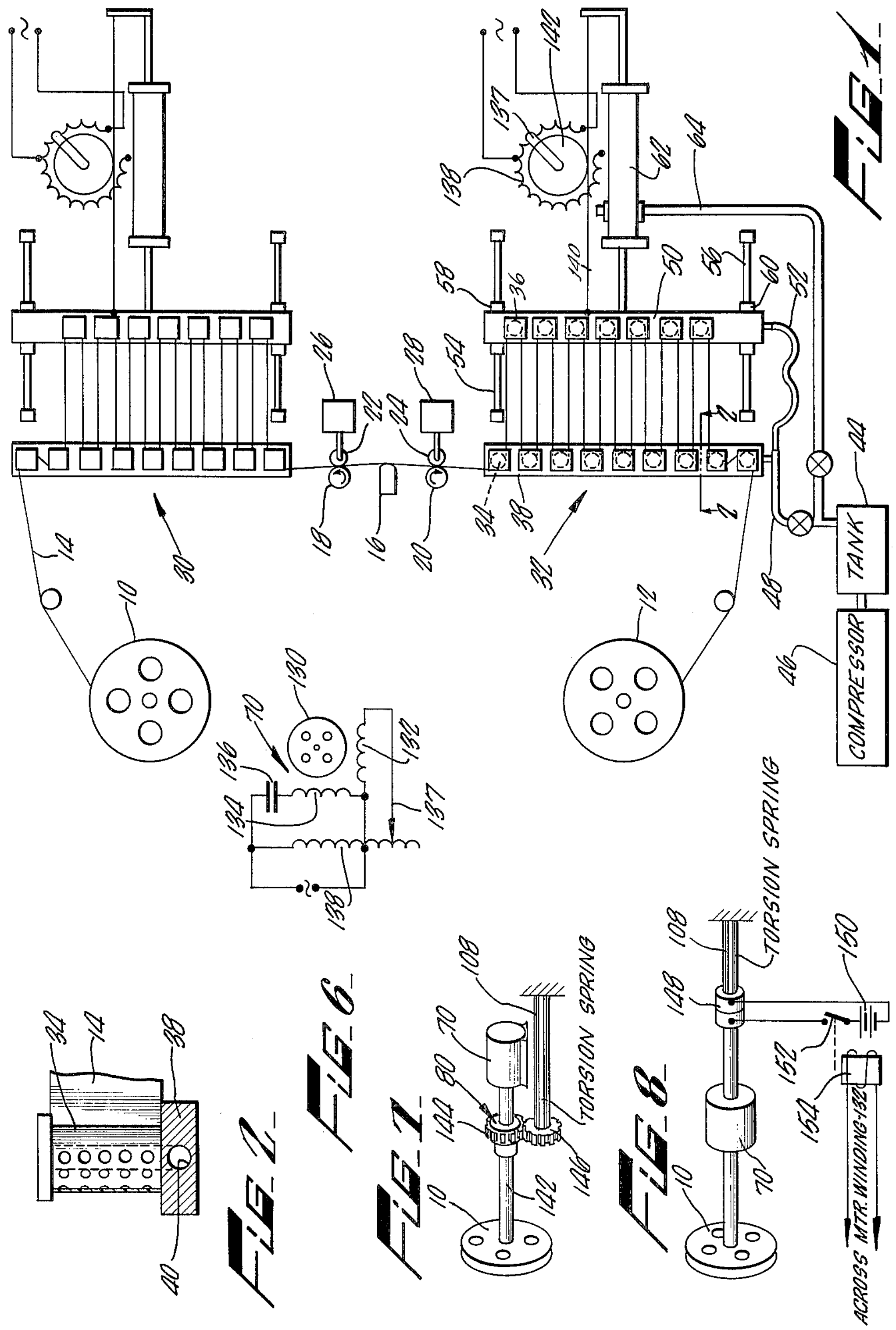
FIGURE 2 is a partial sectional view taken substantially along the line 2—2 of FIGURE 1.
FIGURE 4 is a sectional view taken substantially on the line 4—4 of FIGURE 3.
FIGURE 6 is a schematic wiring diagram of the reel motor control circuit.
FIGURE 7 is a schematic showing of an alternative arrangement for the reel drive.
FIGURE 8 is a schematic showing of a further modification of the reel drive.

Referring to the drawings in detail, with particular reference first to FIGURE 1, the tape transport includes a supply reel 10 and a take-up reel 12. Magnetic tape, indicated at 14, is transferred in either direction between the two reels through an operational zone which includes a magnetic transducer head 16 and a pair of drive capstans 18 and 20 which are driven in opposite directions of rotation at constant speed by suitable motor drive means (not shown). The tape is engaged with one or the other of the two capstans by means of associated pinch rollers 22 and 24. The pinch roller 22 is brought into engagement with the magnetic tape and capstan 18 by means of a solenoid actuator 26. The pinch roller 24 is brought into engagement with the magnetic tape and the capstan 20 by a solenoid actuator 28.

The capstan drive arrangement, which is well known in the digital tape recording art, is capable of bringing the tape up to full speed in either direction past the head 16 in a brief instant of time because of the high speed of the actuators 26 and 28 and because of the relatively low inertia of the magnetic tape. However, the reels storing the magnetic tape have a relatively high angular momentum when operating at full speed and are not capable of reversing in the short space of time in which the direction of tape in the operational zone can be reversed. As a result, it is necessary to maintain slack in the tape between the reels and the operational zone to absorb the initial difference in tape speed at the reels and in the operational zone while the reels are changing direction and coming back up to speed. One technique of providing such buffering in the past has been to thread the tape in serpentine fashion over two groups of guide rollers, one group being relatively movable with respect to the other and spring loaded to maintain tension in the tape as it threads over the guide rollers. Because of the high mechanical mass of the rollers and the moving support for the movable group or rollers, such an arrangement has still reflected an undesirably large load on the tape in the operational zone and thus reducing the acceleration time of the tape up to full speed through the operational zone. Vacuum buffers have likewise been used to maintain a slack loop between the reels and the operational zone but the columns, in order to store sufficient length of tape, have to be quite long and therefore are cumbersome to incorporate into a tape transport unit.

The present invention, as shown in FIGURE 1, provides improved slack loop buffering units, as indicated generally at 30 and 32, located respectively between the reel 10 and the operational zone and the reel 12 and the operational zone. Since these two buffering units are identical, a detailed description is limited to the buffering unit 32 of FIGURE 1. The buffering unit includes a group of stationary guide posts 34 and a group of movable guide posts 36. The stationary guide posts 34 project from an elongated support member 38. As best seen in FIGURE 2, the support member 38 has a passage 40 extending therethrough which is in communication with a passage 42 in each of the fixed guide posts 34. The guide posts 34 are provided with a series of small openings in the periphery thereof and communicating with the passage 42. Air applied under pressure to the passage 40 is thereby discharged at the surface of the fixed guide posts 34 to provide an air cushion for the magnetic tape as it passes over the guide posts. Air may be supplied from a suitable pressure tank 44 in which air is maintained under pressure by a compressor 46. An air line 48 extends from the pressure tank 44 to the guide post support member 38.

The movable group of guide posts 36 are similarly supported by an elongated support member 50. The movable guide posts are constructed in the same manner as the fixed guide posts 34, air being provided under pressure through a flexible hose connection 52 from the air pressure line 48 to an air distributing passage in the support member 50.

The tape extends in serpentine fashion between the fixed guide posts 34 and the movable guide posts 36, there being, for example, eight such loops providing a total of the order of 100 inches of slack or excess length of tape between the reel 12 and the magnetic head 16. One of the features of the tape transport arrangement of the present invention is that the tape 14 and the groups of fixed guide posts in the two buffering units 30 and 32 are in substantial alignment. The significance of this feature will become apparent in the later description of the operation of the unit.

Support for linear movement of the movable group of guide posts 36 and associated support member 50 is provided by suitable means such as a pair of fixed guide rods 54 and 56 which pass through elongated guide bushings 58 and 60 respectively secured to either end of the movable support member 50. To maintain the tape under tension as it passes between the fixed guide posts 34 and movable guide posts 36, means is provided for urging the movable guide posts 36 away from the fixed guide posts 34. While a spring might be used for this purpose, an air cylinder 62 has been found preferable since it is capable of maintaining substantially constant tension on the tape over the full range of movement of the movable guide posts 36. The air cylinder 62 is connected to the pressure tank 44 through a suitable air line 64.

The above described slack loop buffering arrangement has been found superior to other buffering arrangements because it reflects a very small load back on the tape in the operational zone during maximum acceleration of the tape in the operational zone. The air bearings provided by the guide posts reduce the friction imposed on the tape as it passes through the buffers to a very small value. In addition, by making the guide posts fixed instead of rotatable, as has been the practice in the past, there is no rotating mass to be accelerated with changes in the length of the loops. The linear acceleration of the group of moving guide posts reflects substantially no load on the tape because of the large mechanical advantage achieved by virtue of the eight loops. A much larger number of loops can be accommodated than was heretofore possible because of the non-rotation guide posts and the reduced friction of the air bearings. Also the straight line path of the tape between the two buffering units through the operational zone imposes a minimum of interference with acceleration of tape through the operational zone.

Figures 3, 4, 5:
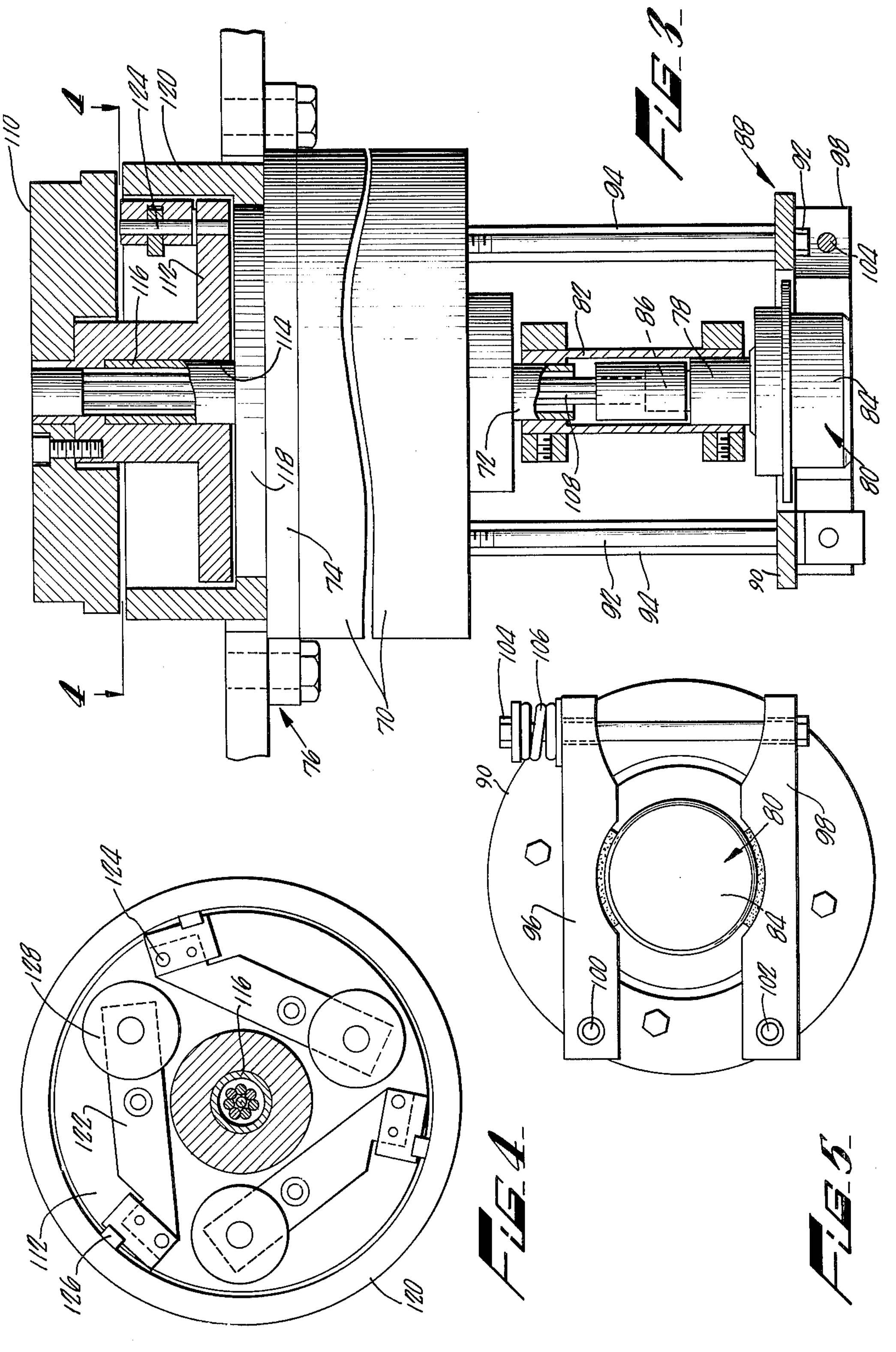
FIGURE 3 is a detailed view partly in section of a reel drive motor and associated reel drive assembly.
FIGURE 5 is an end view of the reel drive assembly of FIGURE 3.

Another feature of the digital transport design incorporating the present invention is in the reel drive arrangement. Provision for a high accelerating torque for the reels without imposing large peak loads on the torque motors is accomplished by means of a unique reel drive assembly as shown in FIGURES 3, 4, and 5. The reel motor drive assembly includes a two-phase induction torque motor 70 having an output shaft 72. The motor is provided with a mounting flange 74 at one end by means of which it is bolted to the frame of the transport, indicated generally at 76. The shaft 72 of the motor 70 is coupled to a shaft 78 on the input to an anti-feedback clutch, indicated generally at 80. The coupling is through a hollow shaft section 82 which is concentric with the output shaft 72 of the motor and the input shaft 78 of the clutch.

The anti-feedback clutch 80 includes a housing having a cylindrical housing portion 84 and an output shaft 86. The input shaft 78 and output shaft 86 are concentric and rotatable along the common axis with the cylindrical housing portion 84. The clutch has the characteristic that with the housing anchored, torque applied to the input shaft 78 produces equal rotation of the output shaft 86 in the same direction of rotation as the input shaft. However, if a load torque is applied to the output shaft 86, it applies a torque to the housing but does not apply a torque to the input shaft 78. Such anti-feedback clutch devices are well known and are commercially available, one such clutch device being sold under the trademark Rev-Lock.

The housing of the clutch 80 is supported in a torque limiting friction clutch, indicated generally at 88. The friction clutch assembly includes a mounting plate 90 which is supported from the motor 70 by suitable bolts 92 and spacers 94. The cylindrical portion 84 of the housing is engaged by a pair of friction shoes 96 and 98 which are pivotally secured at one end to the plate 90 by hinge pins 100 and 102. The opposite ends of the friction shoes are drawn together by a spring loaded arrangement including a bolt 104 which passes through the shoe 96 and is secured to the shoe 98. A compression spring 106 between the shoe 96 and the head of the bolt 104 urges the friction shoes 96 and 98 towards each other and into clamping relationship with the cylindrical portion 84 of the housing of the clutch 80. The friction clutch provides an overload device for the anti-feedback clutch 80 in the event of excessive loads reflected back to the output shaft of the anti-feedback clutch.

The drive shaft 72 of the motor 70 is hollow so as to provide a concentric passage extending through the motor to the opposite end thereof from the clutch 80. A torsion bar spring 108 extends through the hollow shaft 72 of the motor 70. One end of the torsion bar spring is connected to the output shaft 86 of the clutch 80. The other end of the torsion bar spring is connected to the reel hub, indicated at 110.

The reel hub 110 is integral with a flange member 112 having a central bore 114 which is journalled for rotation on a stationary hollow shaft 116. The shaft 116 is integral with a flange plate 118 secured to the end of the motor 70. A cylindrical drum 120 is concentric with the flange member 112 and surrounds the flange plate 118 and is secured thereto.

A centrifugally operated brake unit is carried by the flange member 112 and rotates with the reel hub 110 and associated reel. The centrifugally operated brake includes three identical brake arms, one of which is indicated at 122. The brake arm is pivotally supported from the flange member 112 by a hinge pin 124. A friction pad 126 engages the inner surface of the drum 120. As the reel hub rotates at increasing speeds, a weight 128 on the free end of the arm 122 forces the pad 126 into ever tighter engagement with the inner surface of the drum 120.

The centrifugal brake provides a drag which increases as the speed of the reel increases. This drag has the effect of providing a load on the reel motor at all times to prevent the anti-feedback clutch from locking up due to an overrunning of the reel. This is particularly important in the case of the reel from which tape is being pulled. Without the drag the supplying reel would tend to drive the associated motor.

Each of the reel motors is controlled by the simple control circuit shown schematically in FIGURE 6. The two-phase motor 70 includes an induction rotor 130 and two-phase windings 132 and 134. The winding 134 is connected through a phase splitting capacitor 136 across a source of alternating current. The other phase winding 132 is connected to one side of the source and to the moving contact of a variable auto-transformer 138. As shown in FIGURE 1, the moving contact of the auto-transformer is shown to be rotated, by way of example only, by a cable 140 extending from the movable guide posts supporting member 50 to the output shaft of the air cylinder 62. The cable 140 takes a turn around a pulley 142 mounted on a common shaft with the contact arm 137 of the auto-transformer 138. In operation, an increase in tension in the tape causes the movable guide posts to be drawn towards the stationary guide posts, thereby producing a rotation of the contact arm 137 of the auto-transformer 138. As a result, the voltage across the phase winding 132 of the reel motor 70 is changed to adjust the torque on the reel and thereby reduce the tension in the tape.

While the operation of the invention is believed evident from the above description, a brief review of the operation is made by way of summary. Assume that the actuator 24 is engaged, causing the tape to be moving downwardly through the operational zone. The servo arrangement associated with the reel motor of the take-up reel 12 causes the reel motor to drive the reel 12 at a speed at which tape is removed from the buffering unit at the same rate that it is fed into the buffering unit from the operational zone. Any change in the rate at which the reel 12 removes tape from the buffering unit 32 reduces or increases the tension in the tape, thus causing the movable guide posts 36 to move. The resulting change in the auto-transformer adjusts the voltage on the reel motor to automatically correct the rate at which tape is removed from the buffering unit so as to restore the operation to the condition in which tape is being removed at the same rate as it is being fed into the buffering unit 32.

If the pinch roller actuator 26 is then energized and the pinch roller 24 is released, the tape is abruptly reversed and brought up to speed in the reverse direction through the operational zone. At this moment, the reel 12 is still removing tape from the buffering unit 32. Thus the length of the loops in the buffering unit 32 are rapidly shortened as tape is removed from the slack loops by both the capstan drive 18 and by the rotating reel 12. The abrupt shortening of the loop length causes a repositioning in the auto-transformer in a direction to build up an opposing torque on the rotor of the reel motor associated with the reel 12. As the reel motor stops and begins to turn in the opposite direction, the angular momentum of the reel 12 causes it to overrun, resulting in the anti-feedback clutch being locked up and thus in effect anchoring one end of the torsion spring to the frame of the machine. Thus the kinetic energy of the turning reel produces a twist of the torsion bar spring 108. The kinetic energy of the rotating reel is transferred to the torsion bar spring and the reel hub begins to rapidly decelerate. When it comes to a stop and begins to rotate in the opposite direction, the reel hub acceleration is increased by the action of the torsion bar spring in transferring energy back to the reel hub. The damping action of the centrifugal brake unit associated with the reel hub prevents the reel from overrunning the motor in the reverse direction and the reel motor drive rapidly settles down to constant speed of rotation in the opposite direction so as to feed back tape into the buffering unit 32 to the operational zone.

The energy storage effect of the torsion bar spring in combination with the anti-feedback clutch greatly reduces the peak load imposed on the reel motor during the reversing process. As a result, the motor can be designed for a much lower maximum torque capability and therefore the power demands on the servo control for the motor are greatly reduced. For this reason, servo control can be derived through a simple auto-transformer without the need for any power amplifiers in the servo drive.

It should be noted that although the preferred embodiment is described as having a torsion spring between the reel hub and the output of the anti-feedback clutch, the same effect could be achieved by providing a rigid connection between the reel hub and the output of the clutch and providing a torsion spring or other resilient coupling between the housing of the clutch and the frame of the machine. In either event, the effect of the anti-feedback clutch is to provide a direct coupling from the reel back to the frame of the machine through an energy storing spring.

Such an alternative arrangement is shown schematically in FIGURE 7 in which the reel 10 is coupled to the output shaft of the motor 70 through the clutch 80 by means of a rigid drive shaft 142. The housing of the anti-feedback clutch 80 is coupled by suitable means such as integral gear teeth 144, which engage the teeth of a meshing gear 146. The torsion spring 108 is connected at one end to the gear 146 and is anchored at the other end to the frame of the machine. In this way, overrunning of the reel 10 transmits a torque through the anti-feedback clutch 80 to the torsion spring 108, winding up the torsion spring.

While the anti-feedback clutch provides a convenient mechanical device for transmitting torque developed by the inertia of the reel to the frame of the machine through a torsion spring, it is also possible to accomplish this function by other means. An alternative arrangement is shown in FIGURE 8 in which the reel 10 is shown directly connected to the output shaft of the servo motor 70. The servo motor 70 is also coupled through an electromagnetically operated clutch 148 to one end of the torsion spring 108. The other end of the torsion spring 108 is anchored to the frame of the machine. The electromagnetic clutch 148 is energized from a battery 150 through a relay operated switch 152. The relay includes a coil 154 which may, for example, be connected across the winding 132 of the servo motor 70. The relay 154 is arranged so that it closes the switch 152 when the voltage across the winding 132 is increased substantially. Thus during the reversing process, for example, a large displacement of the moving contact 137 of the auto-transformer 138 occurs, the relay 154 closes the switch 152 to energize the clutch 148. In this way the inertia of the reel 10 as well as the motor 70 is stored in the torsion spring 108 during the reversing process.

What is claimed is:

1. In a tape transport having a pair of tape storage reels, reversible drive means mounted on a common frame with the reels for driving the tape at constant speed in either direction between the reels, and compliant guide means for the tape between each of the reels and the reversible drive means, reel drive apparatus for each of the reels comprising a reversible torque motor, an anti-feedback clutch having an input shaft connected to the motor, an output shaft, and a housing, the clutch including means for transferring a torque load applied to the input shaft to the output shaft and a torque load applied to the output shaft to the housing rather than to the input shaft of the clutch, a resilient shaft member connected between the reel and the output shaft of the clutch, a centrifugally operated brake connected to the reel for producing a drag torque on the reel that increases with increase in the angular velocity of the reel in either direction, and means responsive to variations in the length of tape passing through the compliant guide means for controlling the torque of the associated reel motor.

2. In a tape transport having a pair of tape storage reels, reversible drive means mounted on a common frame with the reels for driving the tape at constant speed in either direction between the reels, and compliant guide means for the tape between each of the reels and the reversible drive means, reel drive apparatus for each of the reels comprising a reversible torque motor, an anti-feedback clutch having an input shaft connected to the motor, an output shaft, and a housing, the clutch including means for transferring a torque load applied to the input shaft to the output shaft and a torque load applied to the output shaft to the housing rather than to the input shaft of the clutch, a resilient drive member connected between the reel and the output shaft of the clutch, damping means connected to the reel for producing a drag torque on the reel in either direction, and means responsive to variations in the length of tape passing through the compliant guide means for controlling the torque of the associated reel motor.

3. In a tape transport having a pair of tape storage reels, reversible drive means mounted on a common frame with the reels for driving the tape at constant speed in either direction between the reels, and compliant guide means for the tape between each of the reels and the reversible drive means, reel drive apparatus for each of the reels comprising a reversible torque motor, an anti-feedback clutch having an input shaft connected to the motor, an output shaft, and a housing, the clutch including means for transferring a torque load applied to the input shaft to the output shaft and a torque load applied to the output shaft to the housing rather than to the input shaft of the clutch, means coupling the output shaft of the clutch to the reel, a centrifugally operated brake connected to the reel for producing a drag torque on the reel that increases with increase in the angular velocity of the reel in either direction, and means responsive to variations in the length of tape passing through the compliant guide means for controlling the torque of the associated reel motor.

4. In a tape transport having a pair of tape storage reels, reversible drive means mounted on a common frame with the reels for driving the tape at constant speed in either direction between the reels, and compliant guide means for the tape between each of the reels and the reversible drive means, reel drive apparatus for each of the reels comprising a reversible torque motor, an anti-feedback clutch having an input shaft connected to the motor, an output shaft, and a housing, the clutch including means for transferring a torque load applied to the input shaft to the output shaft and a torque load applied to the output shaft to the housing rather than to the input shaft of the clutch, means coupling the output shaft of the clutch to the reel, damping means connected to the reel for producing a drag torque on the reel in either direction, and means responsive to variations in the length of tape passing through the compliant guide means for controlling the torque of the associated reel motor.

5. In a tape transport having a pair of tape storage reels, reversible drive means mounted on a common frame with the reels for driving the tape at constant speed in either direction between the reels, and compliant guide means for the tape between each of the reels and the reversible drive means, reel drive apparatus for each of the reels comprising a reversible torque motor, means coupling the motor to the reel to drive the reel in either direction from the motor, means coupling the reel to the frame including a clutch element, a torque spring element, and means for automatically engaging the clutch element when the motor decelerates, whereby the kinetic energy of the reel is transferred to the torque spring during deceleration, a centrifugally operated brake connected to the reel for producing a drag torque on the reel that increases with increase in the angular velocity of the reel in either direction, and means responsive to variations in the length of tape passing through the compliant guide means for controlling the torque of the associated reel motor.

6. In a tape transport having a pair of tape storage reels, reversible drive means mounted on a common frame with the reels for driving the tape at constant speed in either direction between the reels, and compliant guide means for the tape between each of the reels and the reversible drive means, reel drive apparatus for each of the reels comprising a reversible torque motor, means coupling the motor to the reel to drive the reel in either direction from the motor, means coupling the reel frame including a clutch element, a torque spring element, and means for automatically engaging the clutch element when the motor decelerates, whereby the kinetic energy of the reel is transferred to the torque spring during deceleration, damping means connected to the reel for producing a drag torque on the reel in either direction, and means responsive to variations in the length of tape passing through the compliant guide means for controlling the torque of the associated reel motor.

7. In a tape transport, the combination comprising means engageable with the tape for driving the tape at constant linear speed, means for reversing the direction of tape imparted by said drive means, a reel for storing tape, means for maintaining a slack loop of tape under tension between the reel and the tape driving means, means for sensing variations in length of the slack loop, a reel drive motor, means responsive to the loop sensing means for varying the direction and degree of torque produced by the reel motor with variations in the length of the loop, means coupling the reel motor to the reel including an anti-feedback clutch having an input shaft and an output shaft, the anti-feedback clutch only transmitting torque from the input shaft in either direction of rotation to the output shaft but not transmitting torque from the output shaft to the input shaft, the reel motor being coupled to the input shaft, and a spring member connecting the reel to the output shaft of the clutch for storing energy and releasing it to the reel during the reversal of the reel drive motor.

8. In a tape transport, the combination comprising means engageable with the tape for driving the tape at constant linear speed, means for reversing the direction of tape imparted by said drive means, a reel for storing tape, means for maintaining a slack loop of tape under tension between the reel and the tape driving means, means for sensing variations in length of the slack loop, a reel drive motor, means responsive to the loop sensing means for varying the direction and degree of torque produced by the reel motor with variations in the length of the loop, and means coupling the reel motor to the reel including an anti-feedback clutch having an input shaft and an output shaft, the anti-feedback clutch only transmitting torque from the input shaft in either direction of rotation to the output shaft but not transmitting torque from the output shaft to the input shaft, the reel motor being coupled to the input shaft and the reel being coupled to the output shaft.

9. A tape drive comprising a pair of storage reels journalled for rotation, first and second reel drive motors, means for driving the reels respectively from the two motors, the respective drive means each including an anti-feedback clutch having an input shaft and an output shaft, the anti-feedback clutch only transmitting torque from the input shaft in either direction of rotation to the output shaft but not transmitting torque from the output shaft to the input shaft, the associated motor being coupled to the input shaft and a torsion spring coupled between the associated reel and the output shaft of the clutch, the tape extending between the reels, tape drive means engageable with the tape for driving the tape in either direction, a pair of slack loop forming means on either side of the drive member between the drive member and the respective reels, and means responsive to the length of tape in the respective slack loops for controlling the reel motors.

10. A tape drive comprising a frame, a pair of storage reels rotatably mounted on the frame, first and second reel drive motors, means for driving the reels respectively from the two motors, the respective drive means each including means coupling the motor to the reel to drive the reel in either direction from the motor, means coupling the reel to the frame including a clutch element, a torque spring element, and means for automatically engaging the clutch element when the motor decelerates, whereby the kinetic energy of the reel is transferred to the torque spring during deceleration, the tape extending between the reels, tape drive means engageable with the tape for driving the tape in either direction, a pair of slack loop forming means on either side of the drive member between the drive member and the respective reels, and means responsive to the length of tape in the respective slack loops for controlling the reel motors.

11. In a tape transport, the combination comprising means engageable with the tape for driving the tape, means for reversing the direction of tape imparted by said drive means, a reel for storing tape, means for maintaining a slack loop of tape under tension between the reel and the tape driving means, means for sensing variations in length of the slack loop, a reel drive motor, means responsive to the loop sensing means for varying the direction and degree of torque produced by the reel motor with variations in the length of the loop, means coupling the reel motor to the reel, means for storing kinetic energy and releasing it, and means for coupling the reel to said energy storing means when the direction of the reel motor torque is reversed to transfer kinetic energy of the rotating reel to the energy storing means.

12. Apparatus as defined in claim 11 wherein said kinetic energy storage means includes a spring having one end anchored to resist movement, said coupling means coupling the other end of the spring to the reel.

13. Apparatus as defined in claim 12 wherein the coupling means includes a clutch.

14. A reversible drive for a rotating member comprising a motor, means for reversing the direction of torque produced by the motor to reverse the direction of rotation of said member, means coupling the motor to the rotating member for transmitting torque from the motor to the rotating member in either direction of rotation, kinetic energy storage means for storing energy from an energy source and releasing the energy back to the energy source at a controllable rate, and means for transferring energy from the rotating member to the energy storage means when the direction of torque of the motor is reversed by said reversing means and transferring the energy back to the rotating member when the direction of rotation of the member reverses.

15. Apparatus as defined in claim 14 wherein the energy storage means is a spring.

16. Apparatus as defined in claim 15 wherein the energy transferring means includes clutch means for coupling the spring between the rotating member and a stationary anchor, and means for actuating the clutch means when the motor is reversed.

17. Apparatus as defined in claim 16 wherein the clutch means is an anti-feedback type clutch.

18. A tape transport for driving tape at high speed comprising a tape storage reel, a two-phase induction motor coupled to the reel, means for driving the tape through an operational zone, tape guide means including a plurality of fixed guide posts and a plurality of movable guide posts, means for supporting the movable guide posts for movement toward and away from the fixed guide posts, the tape being threaded in serpentine fashion back and forth between the fixed guide posts and the movable guide posts, each of the guide posts having an internal passage and openings between the passage and the surface in engagement with the tape, means for supplying air under pressure to the internal passages of the guide posts, an auto-transformer having a variable tap and a fixed tap, and means for adjusting the position of the variable tap with changes in the position of the movable guide supporting means, one phase of the two-phase motor being connected between the fixed tap and the variable tap for controlling the direction and amount of torque of the two-phase induction motor in response to changes in voltage between the variable tap and fixed tap of the auto-transformer.

References Cited by the Examiner

UNITED STATES PATENTS

| | | | |
|---|---|---|---|
| 2,954,939 | 10/1960 | Herrmann | 242—55.12 |
| 2,997,247 | 8/1961 | McGuire et al. | 242—55.12 |
| 3,032,286 | 5/1962 | Herrmann | 242—55.19 |
| 3,087,664 | 4/1963 | Streeter. | |
| 3,090,573 | 5/1963 | Matovich | 242—55.12 |

MERVIN STEIN, *Primary Examiner.*